S. T. SKEEN.
DRILL.
APPLICATION FILED SEPT. 30, 1915.
1,226,393. Patented May 15, 1917.
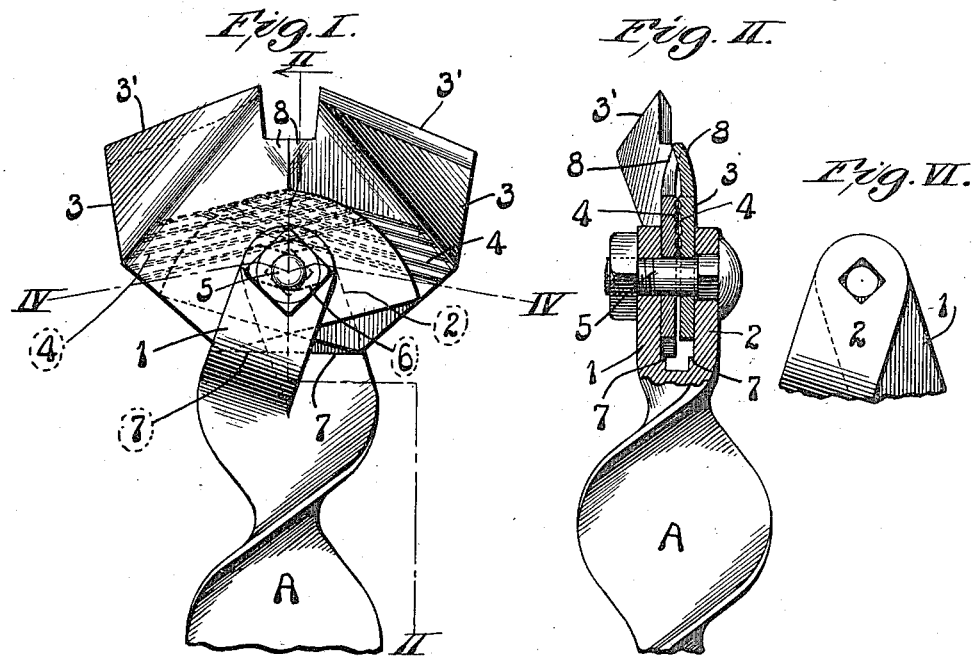
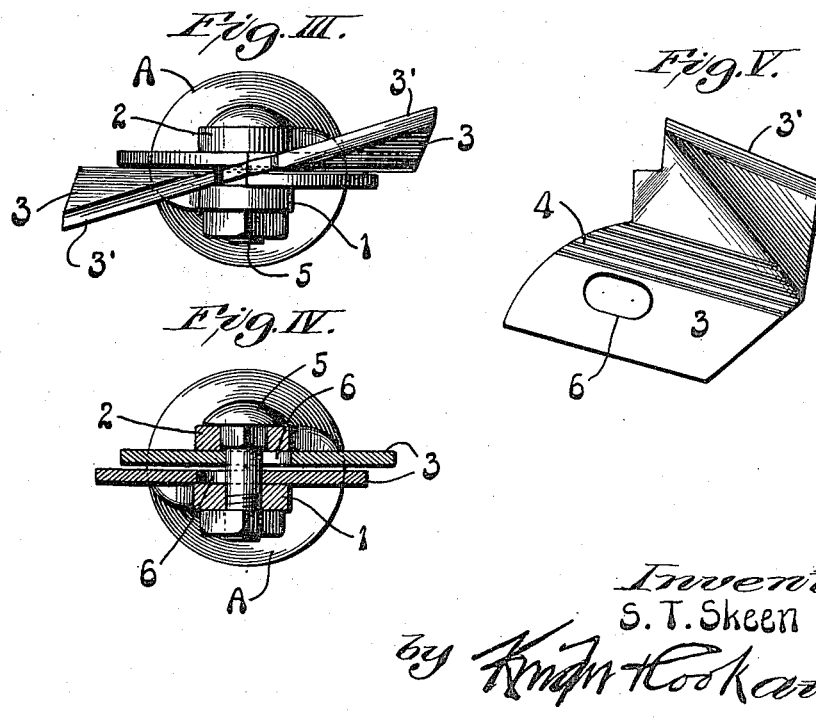
Inventor:
S. T. Skeen

UNITED STATES PATENT OFFICE.

SAMUEL T. SKEEN, OF SANDOVAL, ILLINOIS.

DRILL.

1,226,393.  Specification of Letters Patent.  Patented May 15, 1917.

Application filed September 30, 1915.  Serial No. 53,391.

*To all whom it may concern:*

Be it known that I, SAMUEL T. SKEEN, a citizen of the United States of America, a resident of Sandoval, in the county of Marion, State of Illinois, have invented certain new and useful Improvements in Drills, of which the following is a full, clear, and exact description, reference being had to the accompanying drawings, forming a part of this specification.

My invention relates to a drill particularly adapted for use in drilling into coal deposits, the main object being to produce a simple, inexpensive and very efficient miner's drill. More specifically stated, an object of the invention is to produce a drill comprising a conveyer stem having its conveyer elements deflected at one end to provide a pair of blade holding jaws which form continuations of the conveyer elements. By forming the blade-holder in this manner I simplify the drill structure, and at the same time produce blade-holding jaws which do not materially obstruct the path of the borings. The loose material forced backwardly by the blades, moves freely along the blade-holding jaws, and since these jaws are continuations of the conveyer elements the material will not be materially retarded in passing from the blades to the conveyer. The advantages of such a structure will be readily appreciated by those skilled in the art.

Another object is to produce a miner's drill having a pair of blades adapted to be adjusted away from each other to compensate for wear at the outer points of the blades. A further object is to provide a strong and simple means for securing the blades after they have been adjusted to the desired positions.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a side elevation of a drill embodying the features of my invention.

Fig. II is a section taken approximately on the line II—II, Fig. I.

Fig. III is an end view of the drill.

Fig. IV is a transverse section taken on line IV—IV, Fig. I.

Fig. V is a detail view of one of the blades.

Fig. VI is a fragmentary view showing the blade-holding jaws.

The drill I have shown to illustrate the preferred form of the invention comprises a stem A in the form of a spiral conveyer having its conveyer elements split and deflected at one end to produce a pair of angular blade-holding jaws 1 and 2. These angular jaws form continuations of the spiral conveyer elements, and they are separated from each other to receive a pair of blades 3, each having a cutting edge 3'. When the drill is in service the borings are deflected from the blades and along the jaws to the spiral conveyer elements, the jaws and conveyer elements being so formed that the loose material will pass freely from the blades to the conveyer elements without being obstructed by the jaws.

The blades are fitted together, as shown most clearly in Figs. I and II, the inner face of each blade being provided with a rough gripping face 4 which engages the other blade. The blades are secured to the jaws 1 and 2 by means of a bolt 5 passing through said jaws and blades and provided with a nut which engages the jaw 1. The bolt 5 has a non-circular portion which lies in a correspondingly shaped hole in the jaw 2 so as to prevent the bolt from turning.

Slots 6 are formed in the blades 3 to receive the bolt 5, said slots being at an angle to the axis of the drill stem so that the blades may be adjusted away from each other to compensate for wear at their outer margins. After the blades have been adjusted to the desired position the nut on bolt 5 is tightened to force the blade-holding jaws toward each other, thereby forcing the gripping face 4 of each blade into engagement with the gripping face of the other blade to secure the blades in the jaws. The blades are thus very securely clamped between the yieldable jaws. Abutments 7, formed on the conveyer stem, engage the inner edges of the blades to prevent the latter from being forced backwardly when the drill is in service. The slots 6 (Figs. I and V) allow the blades to be adjusted to various different positions along the abutments 7, and in all of these positions the tendency of the blades to move backwardly is resisted by said abutments 7. The blades tend to move toward each other when the drill is in service, and to prevent such movement the blades are preferably offset at 8 to produce a pair of abutments which engage each other when the blades occupy the positions shown in Figs. I and II.

I claim:

1. A drill comprising a conveyer stem having its conveyer elements deflected and lapped at one end to produce a pair of oppositely disposed jaws which form continuations of said conveyer elements, and a cutting device secured between said jaws and extending therefrom so as to deflect the borings along said jaws.

2. A drill comprising a spiral conveyer stem having its spiral elements split and lapped at one end to produce a pair of opposing blade holding jaws which form continuations of said spiral elements, and blades secured between and extending from said jaws so as to deflect the borings along said jaws and onto the spiral elements.

3. A drill comprising a stem provided with a pair of jaws and a pair of transverse abutments, a pair of blades arranged between said jaws, each of said blades being provided with a slot, and a fastening device passing through the slots and also through said jaws, the inner portion of each of said blades being fitted to one of said transverse abutments, and the outer portion of one blade being offset to form an abutment which engages the other blade to prevent said blades from moving toward each other.

SAMUEL T. SKEEN.

Copies of this patent may be obtained for five cents each, by addressing the "Commissioner of Patents, Washington, D. C."